US012682572B1

(12) United States Patent
Zhou et al.

(10) Patent No.: US 12,682,572 B1
(45) Date of Patent: Jul. 14, 2026

(54) ADAPTIVE MESH REFINEMENT TECHNIQUES FOR THREE-DIMENSIONAL STACKED MODELS

(71) Applicant: ANSYS, Inc., Canonsburg, PA (US)

(72) Inventors: Xiaokai Zhou, Shanghai (CN); Wenbo Xia, San Jose, CA (US); Huangjin Zhao, Austin, TX (US); Wei You, Austin, TX (US); Caleb Matthew Phillips, Austin, TX (US)

(73) Assignee: ANSYS, Inc., Canonsburg, PA (US)

( * ) Notice: Subject to any disclaimer, the term of this patent is extended or adjusted under 35 U.S.C. 154(b) by 125 days.

(21) Appl. No.: 18/653,427

(22) Filed: May 2, 2024

(51) Int. Cl.
*G06T 17/20* (2006.01)

(52) U.S. Cl.
CPC .................................. *G06T 17/205* (2013.01)

(58) Field of Classification Search
CPC .................................................... G06T 17/205
See application file for complete search history.

(56) References Cited

U.S. PATENT DOCUMENTS

| | | | | |
|---|---|---|---|---|
| 7,657,409 | B2 * | 2/2010 | Chow ...................... | G06F 30/23 |
| | | | | 703/2 |
| 10,803,661 | B1 * | 10/2020 | Menon ................ | G06F 3/04842 |
| 12,002,145 | B2 * | 6/2024 | Woop ...................... | G06T 15/06 |
| 2003/0052875 | A1 * | 3/2003 | Salomie .................. | G06T 17/20 |
| | | | | 345/419 |
| 2009/0024347 | A1 * | 1/2009 | Chandra ............... | G06F 30/367 |
| | | | | 702/130 |
| 2012/0026167 | A1 * | 2/2012 | Ran ........................ | G09B 23/40 |
| | | | | 345/420 |
| 2017/0299770 | A1 * | 10/2017 | Brewer .................. | G01V 20/00 |
| 2018/0190013 | A1 * | 7/2018 | Wald .................... | G06T 17/005 |
| 2019/0392100 | A1 * | 12/2019 | Cha ........................ | G06F 30/398 |

* cited by examiner

*Primary Examiner* — Michael Le

(74) *Attorney, Agent, or Firm* — Vorys, Sater, Seymour and Pease LLP; Khaled Shami

(57) ABSTRACT

A computer-implemented method for adaptive mesh refinement includes generating a first mesh for a first layer of a stacked model representing a 3D integrated circuit, the first mesh including a first grid for the first layer, performing a simulation for the stacked model using the first mesh to obtain first results, calculating an interpolated value for a particular grid node according to the first results, the particular grid node corresponding to a node of the first grid in the grid hierarchy. The method further includes generating a second mesh for the layer of the stacked model, the second mesh including a second grid for the first layer, performing a simulation for the stacked model using the second mesh to obtain a simulated value of the particular grid node, comparing the interpolated and simulated value, and generating a refined mesh for the first layer including a refined grid.

20 Claims, 5 Drawing Sheets

ADAPTIVE MESH REFINEMENT TECHNIQUES FOR THREE-DIMENSIONAL STACKED MODELS

FIELD OF THE DISCLOSURE

The present disclosure relates generally to the simulation of three-dimensional stacked models and, more particularly, to methods and systems for adaptive mesh refinement of three-dimensional stacked models.

BACKGROUND OF THE DISCLOSURE

As semiconductor technology continues to advance and the common sizing of integrated circuit components decreases, the modeling and simulation of integrated circuits grows more complex. This increased complexity is further compounded when utilizing three-dimensional integrated circuit (3D-IC) simulations for thermal and electrical analysis of these circuits. While 3D-IC designs can shorten electrical connections and lower parasitic effects within the circuit, 3D-IC designs can include higher power densities, more complex stacking structures, and increased coupling effects when compared to lower-dimensional designs. Continued advancements in circuit and chip technology are likely to favor the use of 3D-IC designs and analysis despite the previously discussed drawbacks.

Current technology using 3D-IC simulations are commonly limited to small die sizes, as the computational power required to model and simulate highly-refined meshes of the circuits can limit the total simulation size. A highly-refined mesh can better capture the thermal and electrical dynamics within the 3D-IC, however, increasing refinement of the mesh for the 3D-IC can exponentially increase the number of calculations and runtime of a simulation. As with many 3D simulations, operators of 3D-IC simulations must commonly choose between the performance speed of the simulation and the accuracy of the simulation. This trade-off between efficient performance of the simulation and the accuracy of the results can be tied directly into the meshing of the circuits.

Accordingly, methods and systems for adaptive mesh refinement of 3D-IC's and other stacked models are desirable to reduce simulation runtimes without impacting accuracy.

SUMMARY OF THE DISCLOSURE

Various details of the present disclosure are hereinafter summarized to provide a basic understanding. This summary is not an exhaustive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

According to an embodiment consistent with the present disclosure, a computer-implemented method for adaptive mesh refinement includes generating a first mesh for a first layer of a stacked model representing a 3D integrated circuit, the first mesh including a first grid for the first layer, the first grid associated with a grid hierarchy, the first grid including a first grid node, performing a simulation for the stacked model using the first mesh to obtain first results, calculating an interpolated value for a particular grid node according to the first results, the particular grid node corresponding to a node of the first grid in the grid hierarchy, and generating a second mesh for the layer of the stacked model, the second mesh including a second grid for the first layer, the second grid associated with the grid hierarchy, and a second grid node of the second grid corresponding to a child grid node of the particular grid node in the grid hierarchy. The computer-implemented method further includes performing a simulation for the stacked model using the second mesh to obtain a simulated value of the particular grid node, generating a comparison between the interpolated value and the simulated value of the particular grid node, and generating a refined mesh for the first layer including a refined grid associated with the grid hierarchy, wherein the refined grid is generated to include the second grid node based on the comparison.

In another embodiment, a system for adaptive mesh refinement of a stacked model with a plurality of layers includes a simulation engine for performing simulations on the stacked model using a plurality of meshes with varying refinement levels, and an adaptive mesh refinement engine for generating the plurality of meshes with an increasing refinement level until a convergence criteria is met. The adaptive mesh refinement engine includes a grid generation module to propagate successive grids in a grid hierarchy from an initial grid to be used in mesh generation, a mesh generation module to generate the plurality of meshes including the initial grid and one or more grid points of the successive grids, an interpolation module to determine an interpolated value for a grid point of the initial grid, a simulation communication module to provide the plurality of meshes to the simulation engine and to receive a simulated value for the grid point of the initial grid, and a decision module to compare a difference between the interpolated value and the simulated value to a pre-determined threshold and determine if the convergence criteria is met, wherein the interpolated value is determined on a first mesh in which each grid point of the initial grid is not included in mesh generation, and wherein the simulated value is determined on a second mesh in which each grid point of the initial grid is included in mesh generation.

In a further embodiment, a computer-implemented method of performing mesh refinement on a stacked model including an initial grid on a plurality of layers to define layered grid points includes receiving a first dataset from a first simulation in which the initial grid is not included in a simulated mesh, calculating an interpolated value for each grid point of the initial grid using the first dataset, receiving a second dataset from a second simulation in which the initial grid is included in the simulated mesh and a further grid is generated including child nodes branching from each layered grid point of the initial grid, calculating a maximum error between the interpolated value and a simulated value of the second dataset for each layered grid point of the initial grid across the plurality of layers, comparing the maximum error of each layered grid point to a pre-determined threshold of mesh convergence, removing converged child nodes of the further grid corresponding to each layered grid point of the initial grid that has a maximum error less than the pre-determined threshold to generate a cleaned grid, and generating a refined mesh from the cleaned grid, wherein the refined mesh includes each grid point of the cleaned grid, and wherein a refined grid is generated including child nodes branching from each grid point of the cleaned grid.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

DETAILED DESCRIPTION

Figure 1:
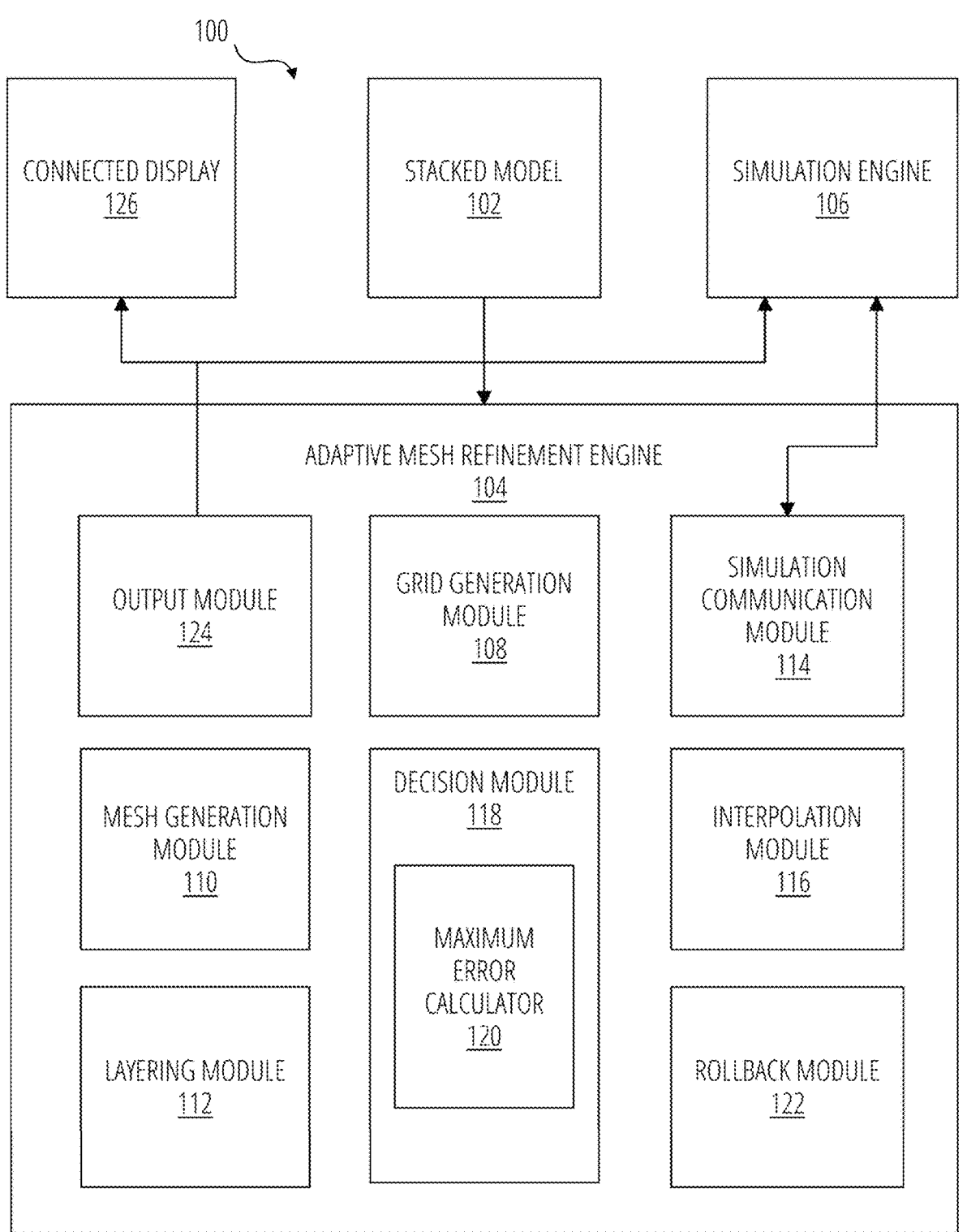
FIG. 1 is a schematic view of an example system for adaptive mesh refinement of a stacked model with a plurality of layers therein.

Embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

Embodiments in accordance with the present disclosure generally relate to the simulation of three-dimensional stacked models and, more particularly, to methods and systems for adaptive mesh refinement of three-dimensional stacked models. The systems and methods disclosed herein can include an adaptive mesh refinement engine operable to communicate with a simulation engine to receive and process simulation results for an active simulation. The results can be used to interpolate values for unrefined meshes, and can compare these interpolated values to simulated values on further refined meshes. Based upon the percent difference between the interpolated value and the simulated value, the methods and systems disclosed herein can retain or rollback newly added grid points of the refined meshes. The methods and systems disclosed herein can continuously and cyclically refine the mesh of a stacked model until all percent difference values are within a pre-determined threshold. Further, the methods and systems disclosed herein can enable uniform meshing across each layer of a stacked model, such that each layered grid point is refined until each grid node of the layered grid point is within the pre-determined threshold.

The embodiments disclosed herein can generate simulation results on stacked models and 3D-IC's that have reduced runtimes of up to about 80% without negatively impacting the accuracy of the simulation when compared to traditional methods. The selective, adaptive mesh refinement of the disclosed embodiments can be driven by results-based metrics, and can maintain necessary uniformity within a stacked model. The sizes of the utilized data structures, as well as the element density of the meshing elements, can be reduced by up to about 95% when compared to traditional methods, as the adaptive mesh refinement can be localized only to areas including high spatial variance.

FIG. 1 is a schematic view of an example system 100 for adaptive mesh refinement of a stacked model 102 with a plurality of layers therein. The system 100 can receive the stacked model 102 from a user input, or can be received automatically during simulation of the stacked model 102. In some embodiments, the stacked model 102 can further include an initial mesh, initial conditions, or other simulation parameters, without departing from the scope of this disclosure. The stacked model 102 can be a 3D-IC design or can be any other layered model for use in a numerical simulation. The system 100 can include an adaptive mesh refinement engine 104 to perform adaptive mesh refinement of the stacked model 102. The system 100 may further include a simulation engine 106 in communication with the adaptive mesh refinement engine 104, such that simulations and mesh refinements can be performed cyclically during analysis of the stacked model 102. While the simulation engine 106 is disclosed to perform simulations on the stacked model 102, the simulation engine 106 can further perform electrical, mechanical, fluid flow, and any other type of simulation without departing from the scope of this disclosure.

The adaptive mesh refinement engine 104 can include a grid generation module 108 operable to generate a grid of points within each layer of the stacked model 102. The grid of points can be selectively utilized in mesh generation and mesh refinement during operation of the system 100. In some embodiments, the grid points can be considered "hard points" for mesh generation thereon. The grid points can be evenly distributed across the stacked model 102 to capture all dimensions of the stacked model 102 during analysis. In some embodiments, an initial grid can be received along with the stacked model 102 from a user input, and the grid generation module 108 can be utilized in further manipulation and refinement of the grid. The initial grid can further be generated as a power-based hard point grid, a hotspot-based hard point grid, a hard point grid uniformly-distributed about one or more components of the stacked model, a machine-learning generated hard point grid, and any combination thereof. The adaptive mesh refinement engine 104 can further include a mesh generation module 110 for generation of successive meshes for use in the simulation engine 106. As discussed above, the grid points generated within the grid generation module 108 can be utilized in mesh generation. As such, the mesh generation module 110 can receive the generated or user-defined initial grid from the grid generation module for creation of an initial or subsequent mesh. The mesh generation module 110 can utilize the initial grid in the creation of the initial mesh on which a first simulation can be performed.

In some embodiments, the adaptive mesh refinement engine 104 can include a layering module 112 operable to propagate or extrude the grid points along each layer of the stacked model 102, such that each layer of the model shares identical grid points at varying height-levels or z-coordinates. The identically placed grid points across each layer of the stacked model 102 can form layered grid points representing the entire stacked model 102. The layering module 112 can further propagate the mesh generated by the mesh generation module 110 to each of the plurality of layers such that each layer is identically meshed throughout the stacked model 102, and to maintain a grid hierarchy within the stacked model 102. In some embodiments, the grid generation module 108 and/or mesh generation module 110 can perform layer propagation of the grid points and mesh, respectively. The adaptive mesh refinement engine 104 can utilize a simulation communication module 114 included therein for communicating the generated mesh to the simulation engine 106 for performance of an initial simulation. The simulation communication module 114 can further receive simulation results from the simulation engine 106 following performance of the initial, and any subsequent, simulations.

The results of the performed simulation can be utilized within the adaptive mesh refinement engine 104 by an interpolation module 116 to determine an interpolated value for the initial grid points of the grid generation module 108. In some embodiments, the initial grid points are omitted from the initial mesh, and are only utilized in the generation of surrounding mesh points. In these embodiments, the interpolation module 116 can utilize linear or higher-order interpolation methods to calculate an interpolated value at each of these initial grid points. Continued operation of the system 100 can include use of the grid generation module 108 to generate refined grid points. The refined grid points, which may be referred to as "leaf nodes", can surround the initial grid points for the creation of a refined mesh. The refined grid points can be received within the mesh generation module 110 to generate a first refined mesh in which the initial grid points are included as simulation points. As such, a further simulation can be performed on the first refined mesh via the simulation engine 106 and results can be received via the simulation communication module 114.

As discussed above, the first refined mesh can include the initial grid points as simulated nodes within the mesh. Accordingly, the results received from the simulation engine 106 can be received within a decision module 118 of the adaptive mesh refinement engine 104 along with the interpolated values generated via the interpolation module 116. The decision module 118 can utilize the interpolated values of the initial simulation and the simulated values of the refined simulation to determine a percent error difference therebetween. The decision module 118 can calculate this percent error difference between the simulated and interpolated value at each of the initial grid points, and can compare the difference to a pre-determined threshold. In some embodiments, the pre-determined threshold can be about 5% of the simulated value, such that an interpolated value within 5% of the simulated value is considered acceptable. In further embodiments, however, the pre-determined threshold can be greater or less than 5%, depending on the application and inputs of the simulation. For grid points in which the difference is less than the pre-determined threshold, the decision module 118 can determine that the level of mesh refinement is acceptable for the initial grid points. For grid points in which the difference is greater than the pre-determined threshold, the decision module 118 can determine that the added "leaf nodes" are required for accurate simulation of the stacked model 102.

In some embodiments, the decision module 118 can further include a maximum error calculator 120 which can determine an error across each grid point of the layered grid points. In some embodiments, the maximum error calculator 120 can determine a maximum percent error difference across each grid point of the layered grid points. In further embodiments, however, the maximum error calculator 120 can utilize any error or difference calculation method as an indicator for mesh refinement. The use of the maximum error calculator 120 can enable the consistent meshing of each layer while maintaining a level of refinement for the most mesh-sensitive layer. As such, the maximum error across the stacking direction of the stacked model 102 can be considered as the error for all grid points of the same layered grid point. The adaptive mesh refinement engine 104 can further include a rollback module 122 which can receive one or more decisions of the decision module 118. The rollback module 122 can utilize the decisions of the decision module 118 to "rollback" the refinement of any grid points which are considered acceptable without the refinement of the first refined mesh. The rollback module 122 can accordingly ignore any grid points which were deemed unacceptable by the decision module 118 and selectively retain only the "leaf nodes" in the areas requiring further refinement.

Operation of the system 100 and adaptive mesh refinement engine 104 can continue cyclically until each of the grid points are deemed acceptable within the decision module 118. Accordingly, the grid and mesh of the stacked model 102 can be continuously selectively refined until all grid points are refined within the pre-determined threshold, and thus meet a "convergence criteria" for the entire mesh. The adaptive mesh refinement engine 104 can ignore any grid points that were previously "rolled back", such that computing power may be saved without continuously refining and un-refining acceptable grid points. Following satisfactory refinement of each of the grid points, the adaptive mesh refinement engine 104 can utilize an output module 124 included therein to output an acceptable mesh from the adaptive mesh refinement engine 104. The output module 124 can be in communication with the simulation engine 106 to produce a final simulation output on an optimized and adaptively refined mesh. Similarly, both the output module 124 and the simulation engine 106 can be in further communication with a connected display 126 of the system 100. The connected display 126 can receive the acceptable mesh, the final simulation output, or a combination thereof and can visualize a desired result for view by an operator.

Operation of the system 100 can limit computational power utilized on performing the simulation process while decreasing the total runtime required. In some embodiments, the use of the system 100 for performance of simulations can reduce runtimes by approximately 80% without any significant loss of simulation accuracy. Similarly, the mesh and grid density of the acceptable mesh can be reduced by up to about 95% when compared to conventional mesh refinement techniques, particularly for 3D-IC designs. Further, the system 100 can utilize stable and repeatable algorithms for consistent results, in contrast to inconsistent and unrepeatable results commonly obtained from current systems.

Figure 2:
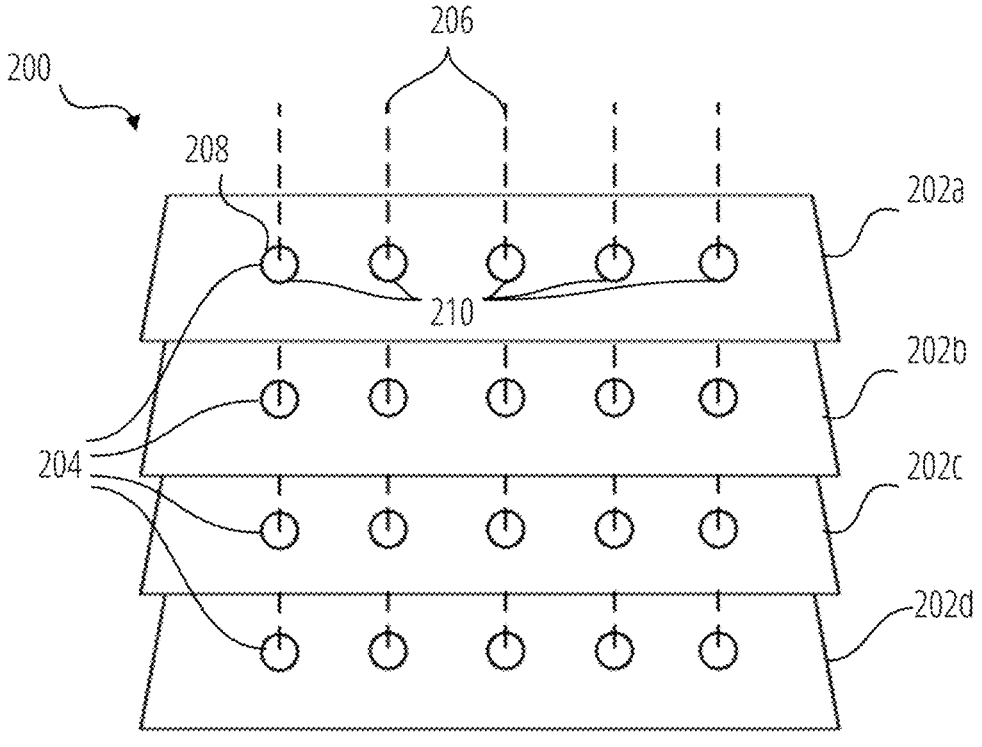
FIG. 2 illustrates an example stacked model with a plurality of layers and layered grid points shown thereon.

FIG. 2 illustrates an example stacked model 200 with a plurality of layers 202a-d and layered grid points 204 shown thereon. Each of the plurality of layers 202a-d can represent a layer of the stacked model 102 in a simplified manner, and the grid center lines 206 can be shown in the stacking direction of the plurality of layers 202a-d. As shown in FIG. 2, each point of each layered grid point 204 is positioned in an identical two-dimensional location on each respective layer 202a-d, while being distributed across the stacking direction. In the illustrated embodiment, a first grid point 208, or first grid node, can be seen on the first layer 202a as part of the first grid 210 of the grid hierarchy shown. The first grid point 208 is similarly included within the layered grid point 204, such that the first grid 210 is distributed across the first layer 202*a* while the layered grid point 204 is distributed across the stacking direction.

Accordingly, when discussing the grid hierarchy, the first grid 210 may reference a grid of points included on a first layer 202*a*, while the layered grid points 204 include an identically located grid point across each layer 202*a-d*. For the calculation of an error by the maximum error calculator 120 of FIG. 1, for example, the maximum error is calculated for each grid point of each layered grid point 204. In this example, if any one of the points in the layered grid point 204 is deemed unacceptable, the entire layered grid point 204 can be refined, regardless of the acceptability of the remaining points of the layered grid point 204. Accordingly, the position and refinement of each layer 202*a-d* can be matched across the example stacked model 200 during adaptive mesh refinement.

Figure 3:
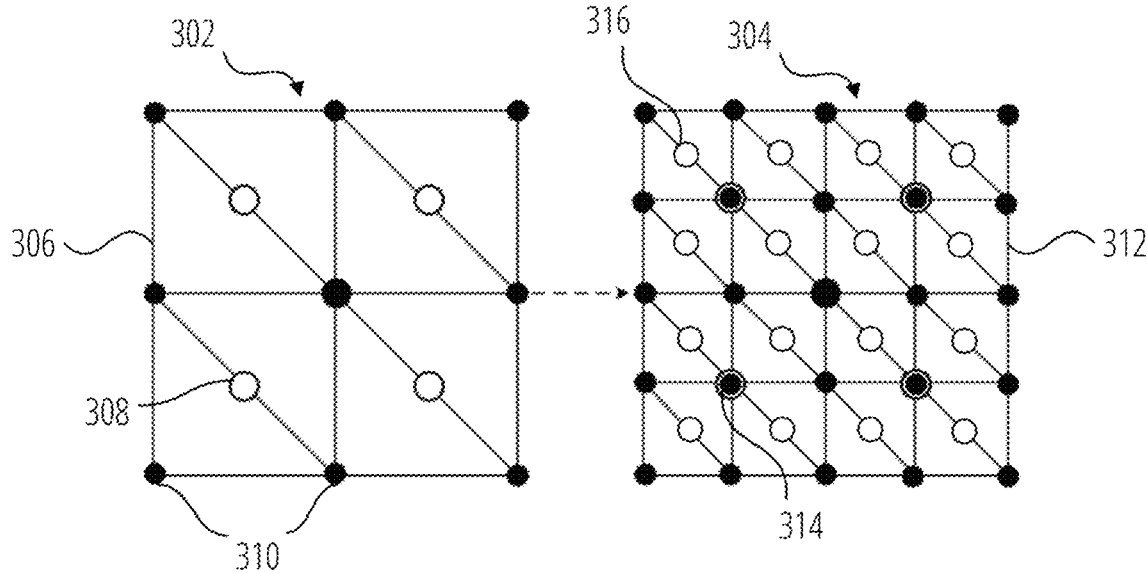
FIG. 3 illustrates an example first mesh and an example second mesh with varying refinement levels.

FIG. 3 illustrates an example first mesh 302 and an example second mesh 304 with varying refinement levels. The example first mesh 302 can represent an unrefined initial mesh, in which the initial grid 306 is utilized for mesh generation. The initial grid 306 can include initial grid nodes or hard points 308 which are utilized in generating the surrounding first mesh 302, but are not included as simulation points 312. The simulation points 310 are formed around the hard points 308 and as nodes of the triangular cells of the first mesh 302. During numerical simulation (e.g., via the simulation engine 106 of FIG. 1), a simulated value can be calculated for each of the simulation points 310 and not for the hard points 308. Accordingly, a linear interpolation can be utilized (e.g., via the interpolation module 116 of FIG. 1) to determine an interpolated value at each hard point 308.

The second mesh 304, in contrast, includes a second grid 312, or refined grid, in which each of the hard points 308 of the first mesh 302 are included as simulation points 310. The second mesh 304 can include refined triangular cells and a plurality of second grid points 314. The second grid points 314 can represent the converted hard points 308 of the first mesh 302 as simulation points 310, such that the second mesh 304 can be utilized in a numerical simulation to yield a simulated value at the same locations. The interpolated value and simulated value at each hard point 308 of the first mesh 302 can be utilized to determine (e.g., via the decision module 118 of FIG. 1) if the refinement of the second mesh 304 is needed for each hard point 308 of the first mesh 302. Within the second mesh 304, it may be further seen that a plurality of further hard points 316 are included within the second grid 312 for generation of the second mesh 304. The further hard points 316 are the child nodes, or leaf nodes, of the initial hard points 308, and can be used in further refinement.

As discussed above, each of the hard points 308 can be independently assessed, and a resulting mesh can include some refinement of the second mesh 304 while rolling back portions of the mesh to that of the first mesh 302. Rolling back of the second mesh 304 can include removal of selective numbers of the further hard points 316 for sufficiently refined hard points 308. Further refinement can then be performed on the resulting mesh and remaining further hard points 316, and further comparisons can be performed via the system 100 of FIG. 1 until each hard point 308 and further hard points 316 of the final mesh includes a percent error difference within the pre-determined threshold.

Figure 4:
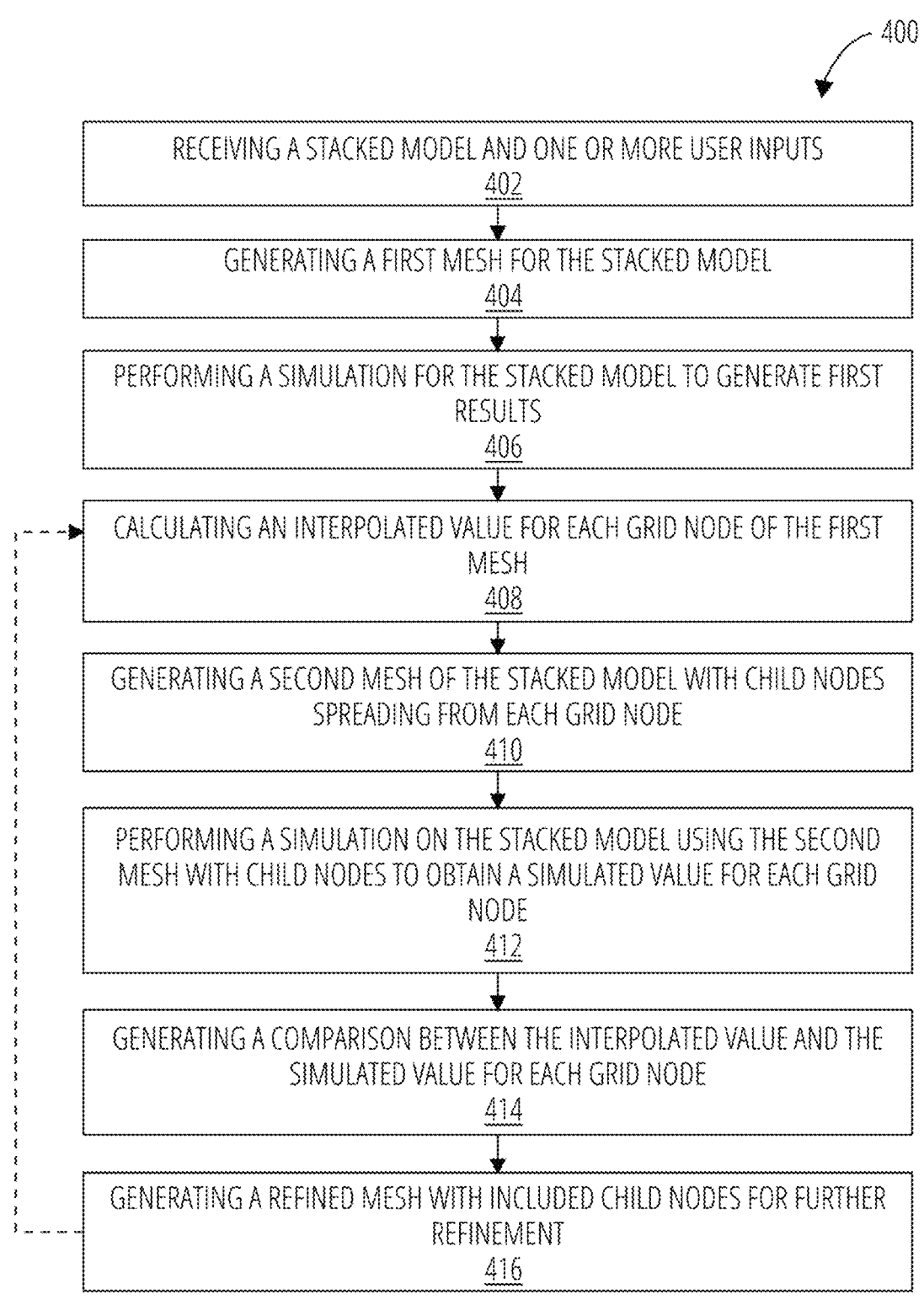
FIG. 4 illustrates a method for adaptive mesh refinement and simulation of a stacked model, in accordance with an embodiment of the present disclosure.
Figure 5:
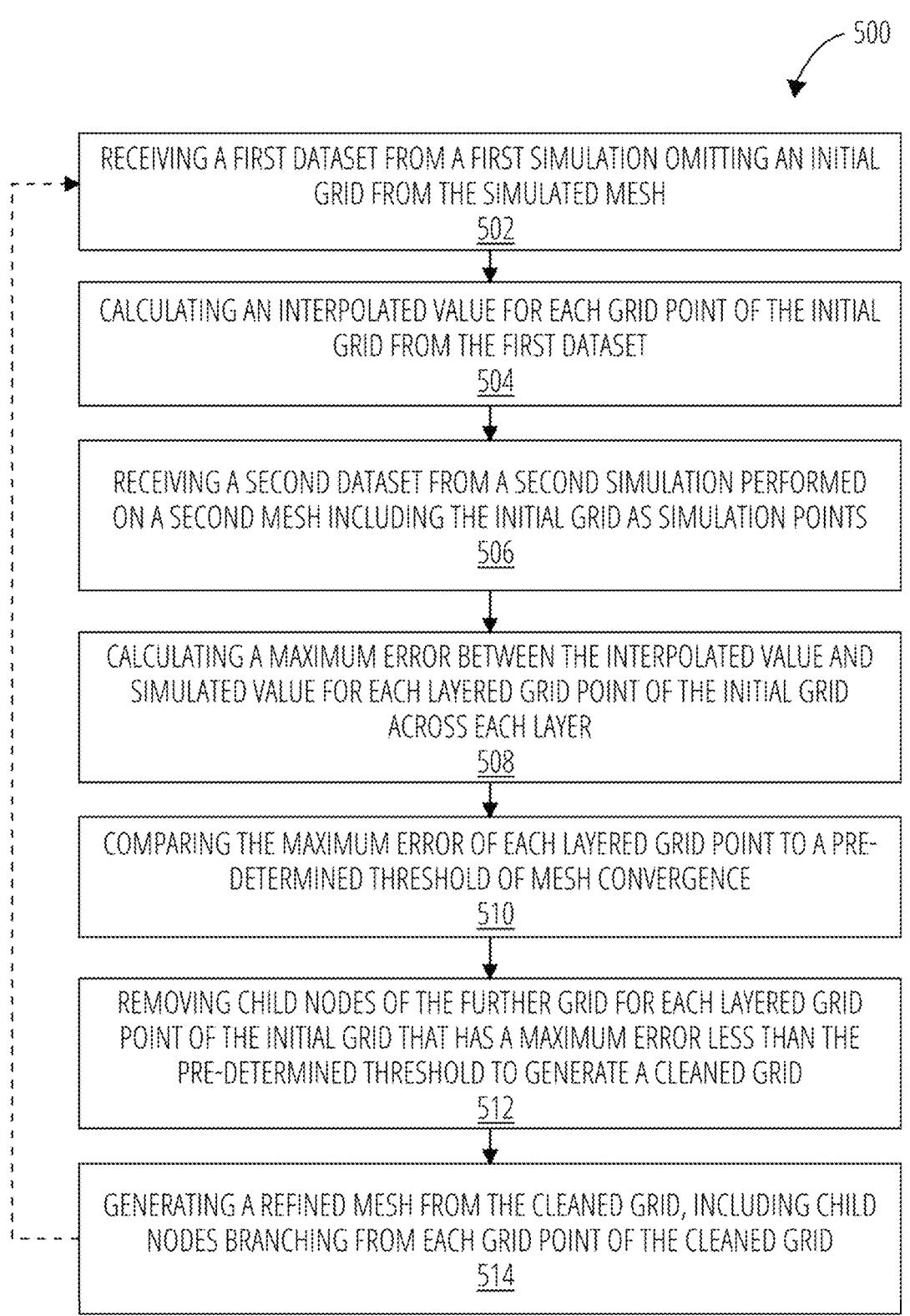
FIG. 5 illustrates a method for adaptive mesh refinement of a stacked model upon receiving simulation data from one or more simulations, in accordance with an embodiment of the present disclosure.

In view of the structural and functional features described above, example methods will be better appreciated with reference to FIGS. 4-5. While, for purposes of simplicity of explanation, the example methods of FIGS. 4-5 are shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement the methods, and conversely, some actions may be performed that are omitted from the description.

FIG. 4 illustrates a method 400 for adaptive mesh refinement and simulation of a stacked model, in accordance with an embodiment of the present disclosure. The method 400 can be implemented by the system 100, as shown in FIG. 1. Thus, reference can be made to the example of FIGS. 1-3 in the example of FIG. 4. The method 400 can begin at 402 with receiving a stacked model (e.g., the stacked model 102) from a device or user, as well as one or more user inputs that can include an initial hard point grid, simulation parameters, or a pre-determined threshold. The method 400 can continue at 404 with generating a first mesh for the stacked model (e.g., the first mesh 302). The first mesh can utilize a user-provided hard point grid for the stacked model or 3D-IC, or can generate an initial hard point grid via a variety of techniques. The first mesh can be generated on a first layer (e.g., the first layer 202*a*) using a first grid (e.g., the first grid 210) to define the bounds and location of the first mesh via one or more first grid nodes (e.g., the first grid point 208). The first mesh can be propagated throughout the stacked model to each further layer (e.g., further layers 202*b-d*) to maintain uniform meshing for each layer of the stacked model (e.g., via the layering module 112). The method 400 can continue at 406 with performing a numerical simulation for the stacked model using the first mesh to obtain first results. The first results can be obtained on the first mesh, in which the hard point grid is not included as a simulation point (e.g., the simulation points 310). In some embodiments, the first results can represent a first, unrefined result for the stacked model.

The method 400 can continue at 408 with calculating an interpolated value for a particular grid node (e.g., the first grid point 208) according to the first results (e.g., via the interpolation module 116). The interpolated value can be calculated using surrounding simulation points and a linear, or higher-order, interpolation scheme to predict a value at each grid node of the hard point grid. As discussed above, the initial particular grid node can correspond to a node of the first grid in the grid hierarchy, but each node will be similarly interpolated at 408. The method 400 can continue at 410 with generating a second, or further, mesh (e.g., the second mesh 304) for the first layer of the stacked model. The second mesh can include a second grid (e.g., the second grid 312) for the first layer, while maintaining association with the grid hierarchy. Within the second mesh, a second grid node of the second grid can correspond to a child grid node, or leaf node, of the particular grid node in the grid hierarchy. As discussed above, the initial hard point grid can be omitted from the first mesh as simulation points. However, in the second mesh, the initial hard point grid is branched into child, or leaf nodes, (e.g., further hard points 316) and the refined mesh includes the initial hard point grid as simulation points.

As such, the method 400 can continue at 412 with performing a simulation for the stacked model using the second mesh to obtain a simulated value of the particular grid node. The simulation can be performed on the second mesh, such that the value at each initial hard point can be simulated and the simulated value can be obtained for the same locations of the previously interpolated values. The method 400 can continue at 414 with generating a comparison (e.g., via the decision module 118) between the interpolated value and the simulated value for the particular grid node, and eventually each grid node of the first mesh/first grid. The comparison generated at 414 can be a maximum error between the two values, and can represent the interpolation error when compared to the simulated value. In some embodiments, the maximum error can be compared to the predetermined threshold to determine if the adaptive mesh refinement has been performed to acceptable levels. If the maximum error is less than the predetermined threshold, the mesh refinement can be rolled back (e.g., via the rollback module 122) and the further hard points can be removed about the particular grid node. In some embodiments, the maximum error can be calculated at 414 for each grid node of a layered grid point (e.g., the layered grid points 204), and the maximum error (e.g., found via the maximum error calculator 120) across the layered grid point can be utilized at each grid node. In this way, the uniform meshing of each layer can be maintained while refining to the most mesh-sensitive grid nodes.

The method 400 can continue at 416 with generating a refined mesh, or third mesh, for the first layer including a refined grid, or third grid, associated with the grid hierarchy, wherein the refined grid is generated to include the child/leaf node, or second grid node, based on the comparison made at 414. As discussed above, the child nodes/leaf nodes can be removed or retained based upon the percent error difference of the particular grid node. Accordingly, the output generated at 416 can include a mix of rolled back and refined grid points, such that only mesh-sensitive areas are refined, thus saving on computational costs and time. The method 400 can cyclically continue at 408, wherein the simulated value for the particular grid nodes are used to interpolate a value for the further hard points remaining in the refined mesh. The method 400 can continue with further refinement, simulation, comparison, and mesh generation until each newly added further hard point is removed at 416, and a final converged mesh can be output (e.g., via the output module 124). The final mesh can be provided back to a simulation engine, or to a connected display (e.g., the connected display 126) for final simulation and visualization of the final mesh.

FIG. 5 illustrates a method 500 for adaptive mesh refinement of a stacked model upon receiving simulation data from one or more simulations, in accordance with an embodiment of the present disclosure. The method 500 can be implemented by the system 100, as shown in FIG. 1. Thus, reference can be made to the example of FIGS. 1-3 in the example of FIG. 5. The method 500 can begin at 502 with receiving a first dataset from a first simulation in which an initial grid is not included in the simulated mesh (e.g., the first mesh 302). In some embodiments, an adaptive mesh refinement engine (e.g., the adaptive mesh refinement engine 104) can be isolated from a simulation engine, such that only the results are received within the adaptive mesh refinement engine. The method 500 can continue at 504 with calculating an interpolated value for each grid point of the initial grid via the first dataset. The interpolation can be performed using a linear, or higher-order, interpolation scheme to calculate an assumed value for each of the un-simulated grid points.

The method 500 can continue at 506 with receiving a second dataset from a second simulation performed on a second mesh (e.g., the second mesh 304). The second mesh can include a plurality of leaf nodes, or child nodes, branching from the initial grid for use in mesh generation and further refinement to form a further grid. The second mesh can include a simulation point (e.g., the simulation points 310) at each location of the initial grid, such that simulated values can be obtained for each of the initial grid points. Using the interpolated value and the simulated value, the method 500 can continue at 508 with calculating a maximum error for each layered grid point of the initial grid across each of the layers. As discussed above, the maximum error can be obtained for the same grid point across each of the layers, and the maximum error can be used for all grid points of the layered grid point to maintain uniform meshing between layers while accommodating the most mesh-sensitive grid points.

The method 500 can continue at 510 with comparing the maximum error for each layered grid point to a pre-determined threshold that denotes a converged mesh. If the maximum error is greater than the pre-determined threshold, the first mesh can be considered too coarse, and the refinement performed in the second mesh can be maintained. If the maximum error is less than the pre-determined threshold, the first mesh can be considered acceptable and the second mesh can be unnecessary for the particular grid node. Accordingly, the method 500 can continue at 512 with removing the child nodes, or leaf nodes, of the further grid for those particular grid nodes that were previously deemed acceptable. The removal of the unnecessary child nodes, or leaf nodes, can produce a cleaned grid, in which some components of the further grid are incorporated in the initial grid while some layered grid points can remain unrefined. The method 500 can continue at 514 with generating a refined mesh from the cleaned grid, wherein the refined mesh includes each grid point of the cleaned grid. The refined grid can be accordingly generated to include further hard points (e.g., further hard points 316) and child nodes/ leaf nodes branching from each node of the cleaned grid. In some embodiments, the refined mesh can be passed back to a simulation engine, and the method 500 can continue with receiving a third dataset at 502 using the refined mesh. The method 500 can then cyclically continue until the cleaned grid generated at 512 matches the initial grid input to the simulation engine for the current method cycle. At this point, the entire grid/mesh can be considered acceptable, and the mesh refinement process can complete with outputting of the final mesh to a connected display (e.g., the connected display) or back to a simulation engine.

In view of the foregoing structural and functional description, those skilled in the art will appreciate that portions of the embodiments may be embodied as a method, data processing system, or computer program product. Accordingly, these portions of the present embodiments may take the form of an entirely hardware embodiment, an entirely software embodiment, or an embodiment combining software and hardware, such as shown and described with respect to the computer system of FIG. 6. Furthermore, portions of the embodiments may be a computer program product on a computer-readable storage medium having computer readable program code on the medium. Any non-transitory, tangible storage media possessing structure may be utilized including, but not limited to, static and dynamic storage devices, volatile and non-volatile memories, hard disks, optical storage devices, and magnetic storage devices, but excludes any medium that is not eligible for patent protection under 35 U.S.C. § 101 (such as a propagating electrical or electromagnetic signals per se). As an example and not by way of limitation, computer-readable storage media may include a semiconductor-based circuit or device or other IC (such, as for example, a field-programmable gate array (FPGA) or an ASIC), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. A computer-readable non-transitory storage medium may be volatile, nonvolatile, or a combination of volatile and non-volatile, as appropriate.

Certain embodiments have also been described herein with reference to block illustrations of methods, systems, and computer program products. It will be understood that blocks and/or combinations of blocks in the illustrations, as well as methods or steps or acts or processes described herein, can be implemented by a computer program comprising a routine of set instructions stored in a machine-readable storage medium as described herein. These instructions may be provided to one or more processors of a general purpose computer, special purpose computer, or other programmable data processing apparatus (or a combination of devices and circuits) to produce a machine, such that the instructions of the machine, when executed by the processor, implement the functions specified in the block or blocks, or in the acts, steps, methods and processes described herein.

These processor-executable instructions may also be stored in computer-readable memory that can direct a computer or other programmable data processing apparatus to function in a particular manner, such that the instructions stored in the computer-readable memory result in an article of manufacture including instructions which implement the function specified. The computer program instructions may also be loaded onto a computer or other programmable data processing apparatus to cause a series of operational steps to be performed on the computer or other programmable apparatus to realize a computer implemented process such that the instructions which execute on the computer or other programmable apparatus provide steps for implementing the functions specified in flowchart blocks that may be described herein.

Figure 6:
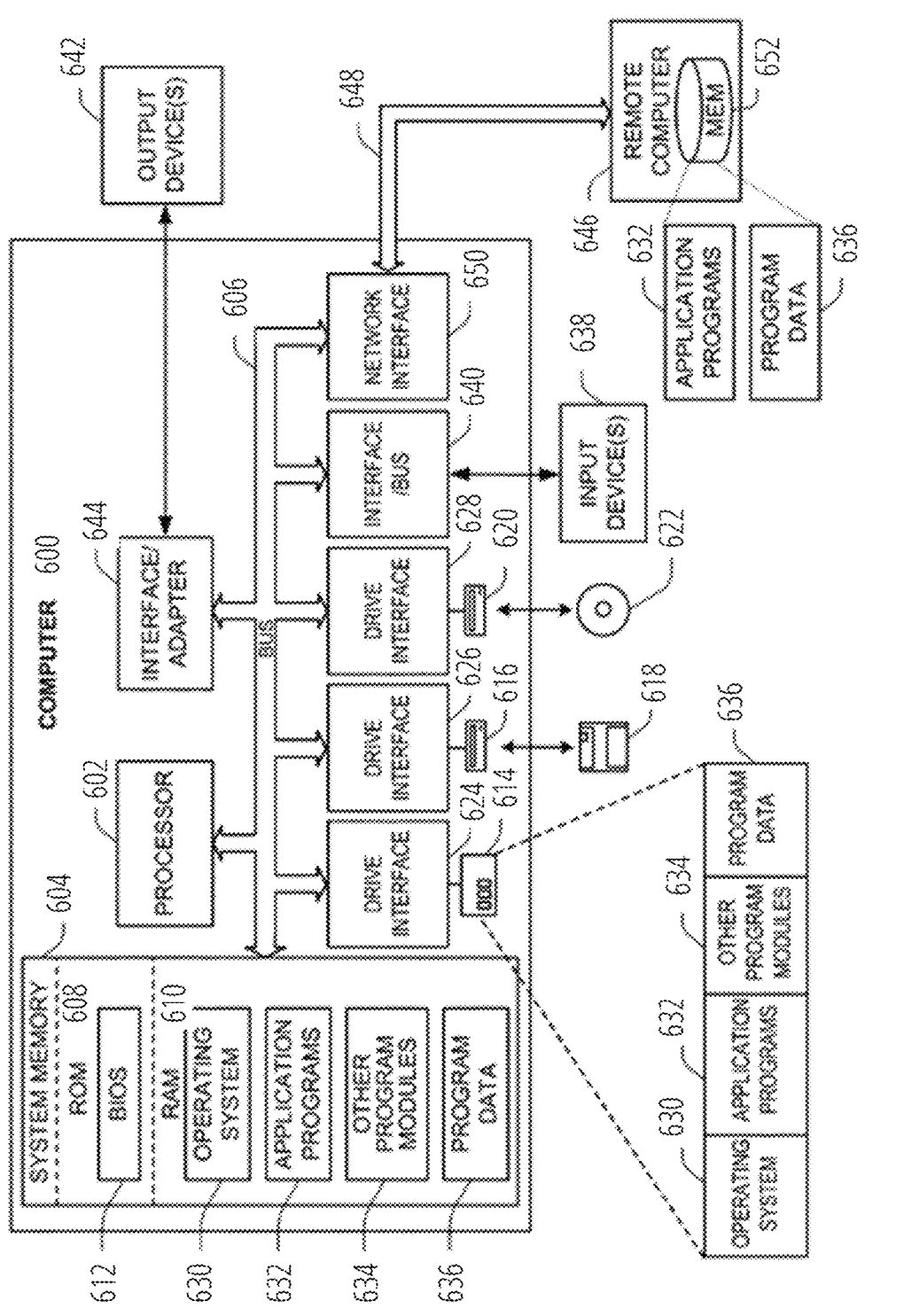
FIG. 6 illustrates one example of a computer system that can be employed to execute one or more embodiments of the present disclosure.

In this regard, FIG. 6 illustrates one example of a computer system 600 that can be employed to execute one or more embodiments of the present disclosure. Computer system 600 can be implemented on one or more general purpose networked computer systems, embedded computer systems, routers, switches, server devices, client devices, various intermediate devices/nodes or standalone computer systems. Additionally, computer system 600 can be implemented on various mobile clients such as, for example, a personal digital assistant (PDA), laptop computer, pager, and the like, provided it includes sufficient processing capabilities.

Computer system 600 includes processing unit 602, system memory 604, and system bus 606 that couples various system components, including the system memory 604, to processing unit 602. System memory 604 can include volatile (e.g. RAM, DRAM, SDRAM, Double Data Rate (DDR) RAM, etc.) and non-volatile (e.g. Flash, NAND, etc.) memory. Dual microprocessors and other multi-processor architectures also can be used as processing unit 602. System bus 606 may be any of several types of bus structure including a memory bus or memory controller, a peripheral bus, and a local bus using any of a variety of bus architectures. System memory 604 includes read only memory (ROM) 608 and random access memory (RAM) 610. A basic input/output system (BIOS) 612 can reside in ROM 608 containing the basic routines that help to transfer information among elements within computer system 600.

Computer system 600 can include a hard disk drive 614, magnetic disk drive 616, e.g., to read from or write to removable disk 618, and an optical disk drive 620, e.g., for reading CD-ROM disk 622 or to read from or write to other optical media. Hard disk drive 614, magnetic disk drive 616, and optical disk drive 620 are connected to system bus 606 by a hard disk drive interface 624, a magnetic disk drive interface 626, and an optical drive interface 628, respectively. The drives and associated computer-readable media provide nonvolatile storage of data, data structures, and computer-executable instructions for computer system 600. Although the description of computer-readable media above refers to a hard disk, a removable magnetic disk and a CD, other types of media that are readable by a computer, such as magnetic cassettes, flash memory cards, digital video disks and the like, in a variety of forms, may also be used in the operating environment; further, any such media may contain computer-executable instructions for implementing one or more parts of embodiments shown and described herein.

A number of program modules may be stored in drives and ROM 608, including operating system 630, one or more application programs 632, other program modules 634, and program data 636. In some examples, the application programs 632 can include the simulation engine 106, the grid generation module 108, the mesh generation module 110, the layering module 112, the simulation communication module 114, the interpolation module 116, the decision module 118, the rollback module 122, and the output module 124, and the program data 636 can include any of the successive meshes, the interpolated values, the simulated values, a percent error difference therebetween, the stacked model, the grid hierarchy, and any combination thereof. The application programs 632 and program data 636 can include functions and methods programmed to perform adaptive mesh refinement on a stacked model during a simulation to produce accurate results with shorter runtimes and reduced mesh densities, such as shown and described herein.

A user may enter commands and information into computer system 600 through one or more input device 638, such as a pointing device (e.g., a mouse, touch screen), keyboard, microphone, joystick, game pad, scanner, and the like. For instance, the user can employ input device 638 to edit or modify the stacked model 102, the pre-determined threshold, the initial hard point grid, the parameters of the simulation engine 106, and any combination thereof. These and other input devices 638 are often connected to processing unit 602 through a corresponding port interface 640 that is coupled to the system bus, but may be connected by other interfaces, such as a parallel port, serial port, or universal serial bus (USB). One or more output devices 642 (e.g., display, a monitor, printer, projector, or other type of displaying device) is also connected to system bus 606 via interface 644, such as a video adapter.

Computer system 600 may operate in a networked environment using logical connections to one or more remote computers, such as remote computer 646. Remote computer 646 may be a workstation, computer system, router, peer device, or other common network node, and typically includes many or all the elements described relative to computer system 600. The logical connections, schematically indicated at 648, can include a local area network (LAN) and/or a wide area network (WAN), or a combination of these, and can be in a cloud-type architecture, for example configured as private clouds, public clouds, hybrid clouds, and multi-clouds. When used in a LAN networking environment, computer system 600 can be connected to the local network through a network interface or adapter 650. When used in a WAN networking environment, computer system 600 can include a modem, or can be connected to a communications server on the LAN. The modem, which may be internal or external, can be connected to system bus 606 via an appropriate port interface. In a networked environment, application programs 632 or program data 636 depicted relative to computer system 600, or portions thereof, may be stored in a remote memory storage device 652.

Embodiments disclosed herein include:

A. A computer-implemented method for adaptive mesh refinement, the method comprising the steps of generating a first mesh for a first layer of a stacked model representing a 3D integrated circuit, the first mesh including a first grid for the first layer, the first grid associated with a grid hierarchy, the first grid including a first grid node, performing a simulation for the stacked model using the first mesh to obtain first results, calculating an interpolated value for a particular grid node according to the first results, the particular grid node corresponding to a node of the first grid in the grid hierarchy, generating a second mesh for the layer of the stacked model, the second mesh including a second grid for the first layer, the second grid associated with the grid hierarchy, and a second grid node of the second grid corresponding to a child grid node of the particular grid node in the grid hierarchy, performing a simulation for the stacked model using the second mesh to obtain a simulated value of the particular grid node, generating a comparison between the interpolated value and the simulated value of the particular grid node, and generating a refined mesh for the first layer including a refined grid associated with the grid hierarchy, wherein the refined grid is generated to include the second grid node based on the comparison.

B. A system for adaptive mesh refinement of a stacked model with a plurality of layers, the system including a simulation engine for performing simulations on the stacked model using a plurality of meshes with varying refinement levels, and an adaptive mesh refinement engine for generating the plurality of meshes with an increasing refinement level until a convergence criteria is met, the adaptive mesh refinement engine including a grid generation module to propagate successive grids in a grid hierarchy from an initial grid to be used in mesh generation, a mesh generation module to generate the plurality of meshes including the initial grid and one or more grid points of the successive grids, an interpolation module to determine an interpolated value for a grid point of the initial grid, a simulation communication module to provide the plurality of meshes to the simulation engine and to receive a simulated value for the grid point of the initial grid, and a decision module to compare a difference between the interpolated value and the simulated value to a pre-determined threshold and determine if the convergence criteria is met, wherein the interpolated value is determined on a first mesh in which each grid point of the initial grid is not included in mesh generation, and wherein the simulated value is determined on a second mesh in which each grid point of the initial grid is included in mesh generation.

C. A computer-implemented method of performing mesh refinement on a stacked model including an initial grid on a plurality of layers to define layered grid points, the method comprising receiving a first dataset from a first simulation in which the initial grid is not included in a simulated mesh, calculating an interpolated value for each grid point of the initial grid using the first dataset, receiving a second dataset from a second simulation in which the initial grid is included in the simulated mesh and a further grid is generated including child nodes branching from each layered grid point of the initial grid, calculating a maximum error between the interpolated value and a simulated value of the second dataset for each layered grid point of the initial grid across the plurality of layers, comparing the maximum error of each layered grid point to a pre-determined threshold of mesh convergence, removing converged child nodes of the further grid corresponding to each layered grid point of the initial grid that has a maximum error less than the pre-determined threshold to generate a cleaned grid, and generating a refined mesh from the cleaned grid, wherein the refined mesh includes each grid point of the cleaned grid, and wherein a refined grid is generated including child nodes branching from each grid point of the cleaned grid.

Each of embodiments A through C may have one or more of the following additional elements in any combination: Element 1: wherein the first grid and the second grid are propagated to each layer of the stacked model, and wherein the interpolated value and the simulated value are calculated for each grid node of the first grid on each layer. Element 2: wherein the first mesh, the second mesh, and the refined mesh are generated for each layer of the stacked model. Element 3: further comprising determining a maximum error between the interpolated value and the simulated value of the particular grid node across each layer. Element 4: wherein the maximum error is determined via a percent error between the interpolated value and the simulated value of the particular grid node across each layer. Element 5: wherein comparing the interpolated value and the simulated value for each grid node includes comparing the maximum error to a pre-determined threshold. Element 6: wherein the refined mesh omits second grid nodes surrounding the particular grid node if the maximum error is less than the pre-determined threshold. Element 7: wherein the refined mesh omits second grid nodes surrounding the particular grid node across all layers if the maximum error is less than the pre-determined threshold. Element 8: further comprising: performing a simulation for the stacked model using the refined mesh to obtain third results; calculating a further interpolated value for a further particular grid node according to the third results, the further particular grid node corresponding to a node of the second grid in the grid hierarchy; generating a further mesh for the layer of the stacked model, the further mesh including a third grid for the first layer, the third grid associated with the grid hierarchy, and a third grid node of the third grid corresponding to a further child grid node of the further particular grid node in the grid hierarchy; performing a simulation for the stacked model using the further mesh to obtain a further simulated value of the further particular grid node; generating a further comparison between the further interpolated value and the further simulated value of the further particular grid node; and generating a further refined mesh for the first layer including a further refined grid associated with the grid hierarchy, wherein the further refined grid is generated to include the third grid node based on the further comparison.

Element 9: further comprising: determining that the further refined mesh includes no third grid nodes based on the further comparison; and outputting the refined mesh as a converged mesh for the stacked model. Element 10: wherein the adaptive mesh refinement engine further includes a layering module to propagate the successive grids and plurality of meshes throughout each layer of the stacked model. Element 11: wherein the decision module includes a maximum error calculator to determine a maximum error between the interpolated value and the simulated value for the grid point across each layer of the stacked model. Element 12: wherein the decision module compares the maximum error to the pre-determined threshold to determine if the convergence criteria is met for the grid point across all layers of the stacked model. Element 13: wherein the adaptive mesh refinement engine further includes a rollback module to remove one or more refined grid points from the second mesh if the convergence criteria is met in the decision module for the grid point. Element 14: wherein the initial grid is selected from the group consisting of a user-defined grid, a power-based hard point grid, a hotspot-based hard point grid, a hard point grid uniformly-distributed about one or more components of the stacked model, a machine-learning generated hard point grid, and any combination thereof. Element 15: wherein the adaptive mesh refinement engine further comprises an output module to output a converged mesh when the convergence criteria is met, and wherein the convergence criteria is met when the difference between the interpolated value and the simulated value is less than the pre-determined threshold at each grid point. Element 16: further comprising: receiving a third dataset from a third simulation using the refined mesh as the simulated mesh; calculating a further interpolated value for each grid point of the cleaned grid using the second dataset; calculating a maximum error of each layered grid point of the cleaned grid between the further interpolated value and a simulated value of the third dataset; and comparing the maximum error of each layered grid point of the cleaned grid to the pre-determined threshold of mesh convergence. Element 17: further comprising: removing further converged child nodes of the refined grid corresponding to each layered grid point of the cleaned grid that has a maximum difference less than the pre-determined threshold to generate a further cleaned grid.

By way of non-limiting example, exemplary combinations applicable to A through C include: Element 1 with Element 2; Element 1 with Element 3; Element 3 with Element 4; Element 3 with Element 5; Element 5 with Element 6; Element 6 with Element 7; Element 8 with Element 9; Element 10 with Element 11; Element 11 with Element 12; and Element 16 with Element 17.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation used herein are merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, if used herein, the terms "coupled" or "coupled to" or "connected" or "connected to" or "attached" or "attached to" may indicate establishing either a direct or indirect connection, and is not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

The invention claimed is:

1. A computer-implemented method for adaptive mesh refinement, the method comprising the steps of:

generating a first mesh for a first layer of a stacked model representing a 3D integrated circuit, the first mesh including a first grid for the first layer, the first grid associated with a grid hierarchy, the first grid including a first grid node;

performing a simulation for the stacked model using the first mesh to obtain first results;

calculating an interpolated value for a particular grid node according to the first results, the particular grid node corresponding to a node of the first grid in the grid hierarchy;

generating a second mesh for the first layer of the stacked model, the second mesh including a second grid for the first layer, the second grid associated with the grid hierarchy, and a second grid node of the second grid corresponding to a child grid node of the particular grid node in the grid hierarchy;

performing a simulation for the stacked model using the second mesh to obtain a simulated value of the particular grid node;

generating a comparison between the interpolated value and the simulated value of the particular grid node; and generating a refined mesh for the first layer including a refined grid associated with the grid hierarchy, wherein the refined grid is generated to include the second grid node based on the comparison.

2. The computer-implemented method of claim 1, wherein the first grid and the second grid are propagated to each layer of the stacked model, and wherein the interpolated value and the simulated value are calculated for each grid node of the first grid on each layer.

3. The computer-implemented method of claim 2, wherein the first mesh, the second mesh, and the refined mesh are generated for each layer of the stacked model.

4. The computer-implemented method of claim 2, further comprising determining a maximum error between the interpolated value and the simulated value of the particular grid node across each layer.

5. The computer-implemented method of claim 4, wherein the maximum error is determined via a percent error between the interpolated value and the simulated value of the particular grid node across each layer.

6. The computer-implemented method of claim 4, wherein comparing the interpolated value and the simulated value for each grid node includes comparing the maximum error to a pre-determined threshold.

7. The computer-implemented method of claim 6, wherein the refined mesh omits second grid nodes surrounding the particular grid node if the maximum error is less than the pre-determined threshold.

8. The computer-implemented method of claim 7, wherein the refined mesh omits second grid nodes surrounding the particular grid node across all layers if the maximum error is less than the pre-determined threshold.

9. The computer-implemented method of claim 1, further comprising:
 performing a simulation for the stacked model using the refined mesh to obtain third results;
 calculating a further interpolated value for a further particular grid node according to the third results, the further particular grid node corresponding to a node of the second grid in the grid hierarchy;
 generating a further mesh for the first layer of the stacked model, the further mesh including a third grid for the first layer, the third grid associated with the grid hierarchy, and a third grid node of the third grid corresponding to a further child grid node of the further particular grid node in the grid hierarchy;
 performing a simulation for the stacked model using the further mesh to obtain a further simulated value of the further particular grid node;
 generating a further comparison between the further interpolated value and the further simulated value of the further particular grid node; and
 generating a further refined mesh for the first layer including a further refined grid associated with the grid hierarchy, wherein the further refined grid is generated to include the third grid node based on the further comparison.

10. The computer-implemented method of claim 9, further comprising:
 determining that the further refined mesh includes no third grid nodes based on the further comparison; and
 outputting the refined mesh as a converged mesh for the stacked model.

11. A system for adaptive mesh refinement of a stacked model with a plurality of layers, the system including:
 a simulation engine for performing simulations on the stacked model using a plurality of meshes with varying refinement levels; and
 an adaptive mesh refinement engine for generating the plurality of meshes with an increasing refinement level until a convergence criteria is met, the adaptive mesh refinement engine including:
 a grid generation module to propagate successive grids in a grid hierarchy from an initial grid to be used in mesh generation,
 a mesh generation module to generate the plurality of meshes including the initial grid and one or more grid points of the successive grids, an interpolation module to determine an interpolated value for a grid point of the initial grid,
 a simulation communication module to provide the plurality of meshes to the simulation engine and to receive a simulated value for the grid point of the initial grid, and
 a decision module to compare a difference between the interpolated value and the simulated value to a pre-determined threshold and determine if the convergence criteria is met,
 wherein the interpolated value is determined on a first mesh in which each grid point of the initial grid is not included in mesh generation, and wherein the simulated value is determined on a second mesh in which each grid point of the initial grid is included in mesh generation.

12. The system of claim 11, wherein the adaptive mesh refinement engine further includes a layering module to propagate the successive grids and plurality of meshes throughout each layer of the stacked model.

13. The system of claim 12, wherein the decision module includes a maximum error calculator to determine a maximum error between the interpolated value and the simulated value for the grid point across each layer of the stacked model.

14. The system of claim 13, wherein the decision module compares the maximum error to the pre-determined threshold to determine if the convergence criteria is met for the grid point across all layers of the stacked model.

15. The system of claim 11, wherein the adaptive mesh refinement engine further includes a rollback module to remove one or more refined grid points from the second mesh if the convergence criteria is met in the decision module for the grid point.

16. The system of claim 11, wherein the initial grid is selected from the group consisting of a user-defined grid, a power-based hard point grid, a hotspot-based hard point grid, a hard point grid uniformly-distributed about one or more components of the stacked model, a machine-learning generated hard point grid, and any combination thereof.

17. The system of claim 11, wherein the adaptive mesh refinement engine further comprises an output module to output a converged mesh when the convergence criteria is met, and wherein the convergence criteria is met when the difference between the interpolated value and the simulated value is less than the pre-determined threshold at each grid point.

18. A computer-implemented method of performing mesh refinement on a stacked model including an initial grid on a plurality of layers to define layered grid points, the method comprising:
 receiving a first dataset from a first simulation in which the initial grid is not included in a simulated mesh;
 calculating an interpolated value for each grid point of the initial grid using the first dataset;
 receiving a second dataset from a second simulation in which the initial grid is included in the simulated mesh and a further grid is generated including child nodes branching from each layered grid point of the initial grid;
 calculating a maximum error between the interpolated value and a simulated value of the second dataset for each layered grid point of the initial grid across the plurality of layers;
 comparing the maximum error of each layered grid point to a pre-determined threshold of mesh convergence;

removing converged child nodes of the further grid cor-
responding to each layered grid point of the initial grid
that has a maximum error less than the pre-determined
threshold to generate a cleaned grid; and generating a refined mesh from the cleaned grid, wherein
the refined mesh includes each grid point of the cleaned
grid, and wherein a refined grid is generated including
child nodes branching from each grid point of the
cleaned grid.

19. The computer-implemented method of claim 18, fur-
ther comprising:

receiving a third dataset from a third simulation using the
refined mesh as the simulated mesh;

calculating a further interpolated value for each grid point
of the cleaned grid using the second dataset;

calculating a maximum error of each layered grid point of
the cleaned grid between the further interpolated value
and a simulated value of the third dataset; and comparing the maximum error of each layered grid point
of the cleaned grid to the pre-determined threshold of
mesh convergence.

20. The computer-implemented method of claim 19, fur-
ther comprising:

removing further converged child nodes of the refined
grid corresponding to each layered grid point of the
cleaned grid that has a maximum difference less than
the pre-determined threshold to generate a further
cleaned grid.

\* \* \* \* \*